UNITED STATES PATENT OFFICE.

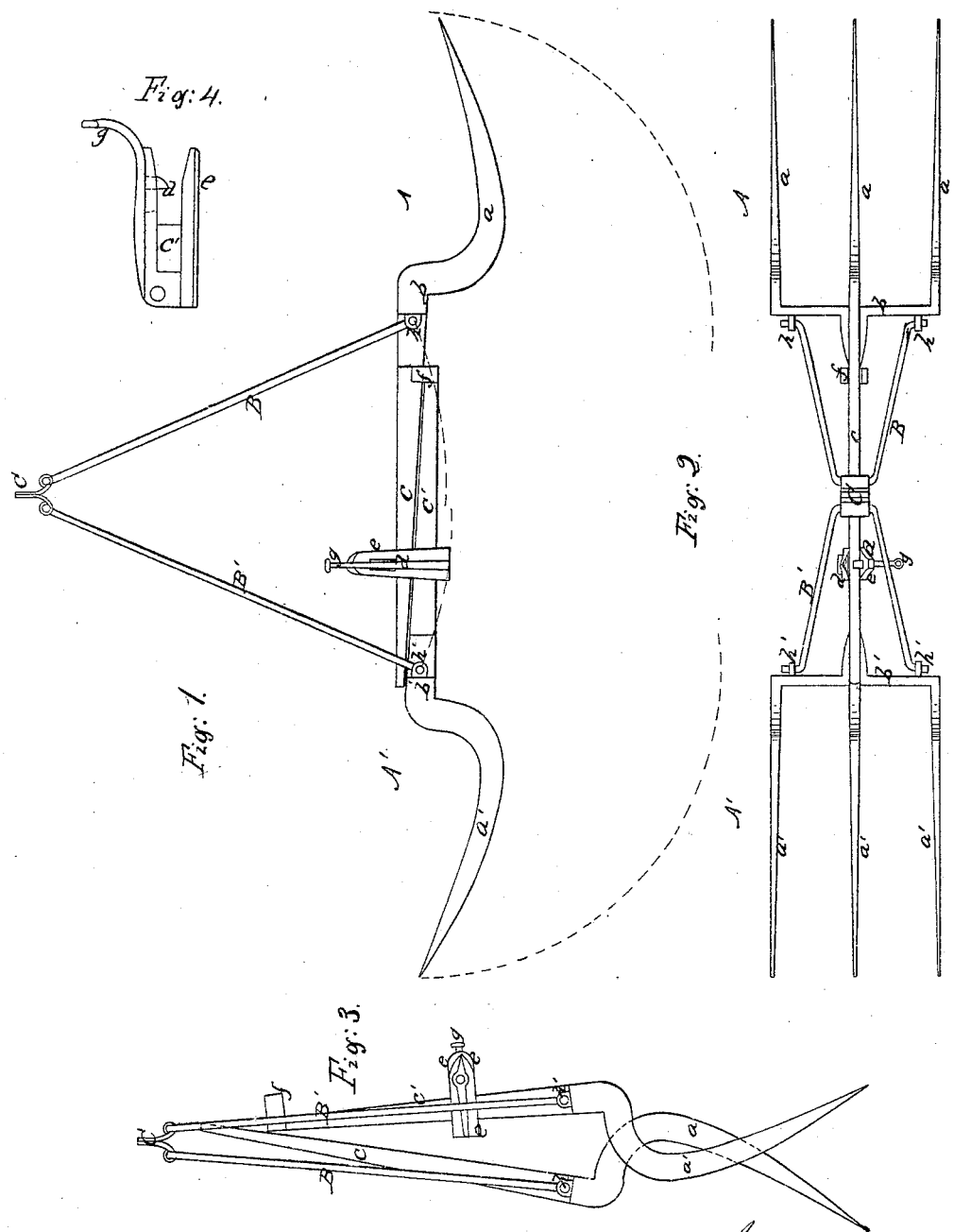

S. H. WHEELER, OF DOWAGIAC, MICHIGAN, ASSIGNOR TO HIMSELF, ABNER G. TOWNSEND, JAMES STILLWELL, R. HEDDON, EVAN P. TOWNSEND, CHAUNCEY T. LEE, AND JAMES SULLIVAN.

IMPROVEMENT IN HORSE HAY-FORKS.

Specification forming part of Letters Patent No. 50,210, dated September 26, 1865.

*To all whom it may concern:*

Be it known that I, S. H. WHEELER, of Dowagiac, in the county of Cass and State of Michigan, have invented a new and Improved Fork for Elevating Hay; and I do hereby declare that the following is a full, clear, and exact description thereof, reference being had to the accompanying drawings, making a part of this specification, in which—

Figure 1 is a side view of the forks suspended in a position for elevating their load. Fig. 2 is a top view of the same. Fig. 3 shows the position of the forks after they have discharged their load. Fig. 4 is an enlarged view of the spring-latch for holding the forks in the position indicated in Figs. 1 and 2.

Similar letters of reference indicate corresponding parts in the several figures.

This invention relates to a new mode of constructing forks which are to be used in the operation of elevating hay upon stacks, wagons, or in barns. It consists in the employment of two forks having curved tines and straight or curved handles, which forks are connected together by means of suspension-rods in such manner that they are grasped and thrust into the hay like an ordinary pitch-fork and then connected together, so that the load on both forks can be elevated to the desired point for depositing it, after which the forks can be separated in such manner that they will tilt and discharge their load.

My invention is intended to facilitate the work of gathering the load upon the forks, and also to be able to elevate a larger body of hay at one time than can be done by the grasping-forks hitherto used.

To enable others skilled in the art to understand my invention, I will describe its construction and operation.

The two forks A A′ are constructed with curved tines $a$ $a'$, united in a suitable manner to cross-heads $b$ $b'$, from which project long handles $c$ $c'$, that may be straight, as represented in the drawings, and tapered toward their extremities. Both of these forks are so constructed that they can be conveniently used like common dung-forks for gathering the hay upon their tines, after which the fork-handles are brought together and held by a spring-latch, $d$, which is applied to the handles $c'$ of the fork A′, as shown in Figs. 1 and 4. This spring-latch $d$ is applied to a yoke, $e$, which embraces the handle $c'$, and projects from two sides of this handle, so as to receive the handle $c$, and to serve, in conjunction with the yoke at $f$, to hold the two handles together, as shown in Figs. 1 and 2. The spring-latch $d$ is projected through one of the jaws of the yoke $e$ so as to catch on top of the handle $c$ of the fork A, to hold the two forks in the position shown in Fig. 1 during the act of elevating a load of hay. The latch $d$ is provided with a projection, $g$, which has an eye through its end to receive a cord, by means of which the latch can be withdrawn and the two forks allowed to discharge their load by assuming the position shown in Fig. 3.

The two forks A A′ are provided with bails B B′, which are pivoted at their lower ends to eyes $h$ $h'$ on their respective fork-heads $b$ $b'$. The upper ends of the bails B B′ are pivoted to an eye-piece, C, above the upper end of the fork-handles, when the forks hang free, as in Fig. 3, and to said eye-piece the rope which is used for elevating the forks is attached.

It will thus be seen that the forks are connected together by means of the suspension-bails at a point which is above the upper ends of the fork-handles, and that for this reason the forks can swing freely beneath the point of connection C. The bails B B′ are pivoted to their respective forks at such points as will cause the two forks, when allowed to swing freely, to assume vertical positions.

The method of loading the forks and discharging the load therefrom is as follows: The fork A′ being detached from its fork A, except at the point C, is grasped by its handle and plunged into the hay and then forced down in a horizontal position. The fork A is now in like manner plunged into the hay and its handle is pressed down upon that of the other fork until the catch $d$ receives and confines the handles together, the handle $c$ being now between the yokes $e$ and $f$, and beneath the catch $d$. Each one of the forks will now be loaded, the hay being held upon them in the same manner that the hay is held upon the common hand pitch-forks, and when thus loaded the forks are elevated by means of a rope passing over a pulley which is located above the stack, and when they are drawn up to the required height the cord which is attached to the spring-latch $d$ is pulled so as to withdraw this latch and allow the forks to assume the position shown in Fig. 3, when they will discharge their load.

It will be seen that the two forks A A' are so constructed that by detaching the suspension-bails B B' they can be used as common pitch-forks.

Having thus described my invention, what I claim as new, and desire to secure by Letters Patent, is—

1. The combination of two forks, A A', provided with the suspension-bails B B' and pivot-connection C, and a tripping and retaining device, $d\ e\ g$, substantially as described.

2. Suspending the forks A A', which have handles $c\ c'$, at a point above the upper extremities of said handles, by means of bails which are pivoted to the two forks, and which connect these forks together, substantially as described.

3. The yoke $f$ and yoke $e$, in combination with the latch $d$, applied to the handle $c'$ of the fork A' and adapted to receive and hold the handle of fork A, substantially in the manner and for the purposes described.

S. H. WHEELER.

Witnesses:
N. B. HOLLISTER,
A. BENEDICT.